(12) United States Patent
Rieder et al.

(10) Patent No.: US 7,735,264 B2
(45) Date of Patent: Jun. 15, 2010

(54) MOTOR VEHICLE DOOR

(75) Inventors: Klaus Rieder, Weissach-Flacht (DE);
Manfred Appel, Mühlacker (DE);
Karlheinz Keller, Pforzheim (DE)

(73) Assignee: Dr. Ing. h.c. F. Porsche AG, Stuttgart (DE)

( * ) Notice: Subject to any disclaimer, the term of this patent is extended or adjusted under 35 U.S.C. 154(b) by 612 days.

(21) Appl. No.: 11/712,038

(22) Filed: Feb. 28, 2007

(65) Prior Publication Data

US 2007/0199248 A1 Aug. 30, 2007

(30) Foreign Application Priority Data

Feb. 28, 2006 (DE) .................. 10 2006 009 523

(51) Int. Cl.
*B60J 5/04* (2006.01)
(52) U.S. Cl. .................. 49/502; 49/372; 296/146.16
(58) Field of Classification Search .................. 49/502, 49/372, 374, 377, 348, 349; 296/146.16, 296/146.2, 201
See application file for complete search history.

(56) References Cited

U.S. PATENT DOCUMENTS

| 4,330,959 | A | * | 5/1982 | Nishikawa | 49/377 |
| 5,168,670 | A | * | 12/1992 | Umeda | 49/502 |
| 6,446,392 | B1 | * | 9/2002 | Maki | 49/377 |
| 6,450,565 | B2 | * | 9/2002 | Yamamoto | 296/187.09 |
| 6,747,093 | B2 | * | 6/2004 | Takahashi et al. | 524/590 |
| 7,234,756 | B2 | * | 6/2007 | Lynam et al. | 296/146.5 |
| 7,448,670 | B2 | * | 11/2008 | Baker et al. | 296/146.6 |

FOREIGN PATENT DOCUMENTS

DE 38 16 347 A1 11/1989
DE 100 38 200 A1 2/2002

* cited by examiner

*Primary Examiner*—Gregory J. Strimbu

(57) ABSTRACT

A motor vehicle door has a door body formed from a door inner part and a door outer panel fastened thereto. The door body has a shaft opening for a window shaft located inside the door body, and a shaft reinforcement fastened to the door inner part. The reinforcement extends below the shaft opening and supports the door outer panel via a downwardly bent flange of the door outer panel. A window seal for the shaft opening is received in a fastening groove formed by an upright longitudinal web of the shaft reinforcement and the downwardly bent flange.

9 Claims, 6 Drawing Sheets

MOTOR VEHICLE DOOR

CROSS-REFERENCE TO RELATED APPLICATION

This application claims the priority, under 35 U.S.C. §119, of German application DE 10 2006 009 523.5, filed Feb. 28, 2006; the prior application is herewith incorporated by reference in its entirety.

BACKGROUND OF THE INVENTION

Field of the Invention

The invention relates to a motor vehicle door.

A generic motor vehicle door, which contains a door body which is formed of a door inner part, which can also be referred to as a frame, and a door outer panel, is known from published, non-prosecuted German patent application DE 100 38 200 A1. The door outer panel is fastened to the door inner part at an edge. A window shaft, which is provided toward the top with a shaft opening so that a window pane supported movably on the door can be lowered into the window shaft and raised again, is formed inside the door body. The window shaft is provided with a shaft reinforcement in a region of its shaft opening, on which moreover the door outer panel is supported with a downwardly bent-off flange. For this purpose, the shaft reinforcement contains two upright longitudinal webs which form a U-shaped fastening groove. The shaft opening is furthermore assigned a window seal, which is retained either together with the flange in the fastening groove or in a separate fastening groove (see FIG. 6 in DE 100 38 200 A1).

Published, non-prosecuted German patent application DE 38 16 347 A1 describes, for a motor vehicle door, a shaft reinforcement which contains a fastening groove formed by two upright webs, into which a downwardly bent-off flange of the door outer panel is inserted and bonded. A second fastening groove receives the window seal.

SUMMARY OF THE INVENTION

It is accordingly an object of the invention to provide a motor vehicle door that overcomes the above-mentioned disadvantages of the prior art devices of this general type, in which the window seal and the outer panel are supported on a shaft reinforcement in a simple way.

With the foregoing and other objects in view there is provided, in accordance with the invention, a motor vehicle door. The door contains a door body formed of a door inner part and a door outer panel fastened to the door inner part. The door outer panel has an upper flange being a downwardly bent-off flange with a lower end portion. The door inner part and the door outer panel define an interior having a window shaft and a shaft opening at a top of the window shaft. A shaft reinforcement is fastened to the door inner part and extends below the shaft opening. On the shaft reinforcement, the door outer panel is supported with the upper flange lying adjacent to the shaft opening and bent off downwardly. The shaft reinforcement has a first upright longitudinal web defining part of a fastening groove. A window seal is assigned to the shaft opening and is received in the fastening groove. The downwardly bent-off flange of the door outer panel is made in a form of a free-standing wall connected firmly to the shaft reinforcement only with the lower end portion, and the free-standing wall delimits the fastening groove laterally together with the first upright longitudinal web.

The advantages mainly achieved with the invention can be seen in that a separate fastening groove for the window seal or the door outer panel can be dispensed with because the downwardly bent-off flange of the door outer panel forms the seat (fastening groove) for the window seal together with the upright longitudinal web. Stable interconnection with the shaft reinforcement is moreover afforded by connecting the end portion of the flange firmly to the longitudinal web. The motor vehicle door according to the invention can furthermore be produced more easily.

In order for it to be possible to limit the insertion depth of the flange or of the window seal, a groove bottom formed by the longitudinal web itself is advantageously provided.

According to a development of the invention, it is advantageous if excess adhesive can be caught between the two longitudinal webs. Use is preferably made of an adhesive which sets or solidifies only under heat action, which can take place, for example, when a body provided with the motor vehicle door is heated, in particular during the heating following what is known as cathodic immersion-painting.

The adhesive mentioned above can be caught particularly advantageously and safely if the longitudinal channel has an appropriate width.

Secure fastening of the door outer panel to the shaft reinforcement is possible, the door outer panel being supported on the shaft reinforcement with the additional fastening lugs, at least until the adhesive has set.

According to an embodiment, the door inner part is stiffened with the shaft reinforcement.

For attractive body styling, the shaft reinforcement can have a curving component, in particular when the shaft reinforcement lies adjacent below what is known as a waistline of the body and is intended to follow its shape, or the door outer panel has a corresponding shape or a curve, if for example the cross section of the door body changes.

Although the invention is illustrated and described herein as embodied in a motor vehicle door, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
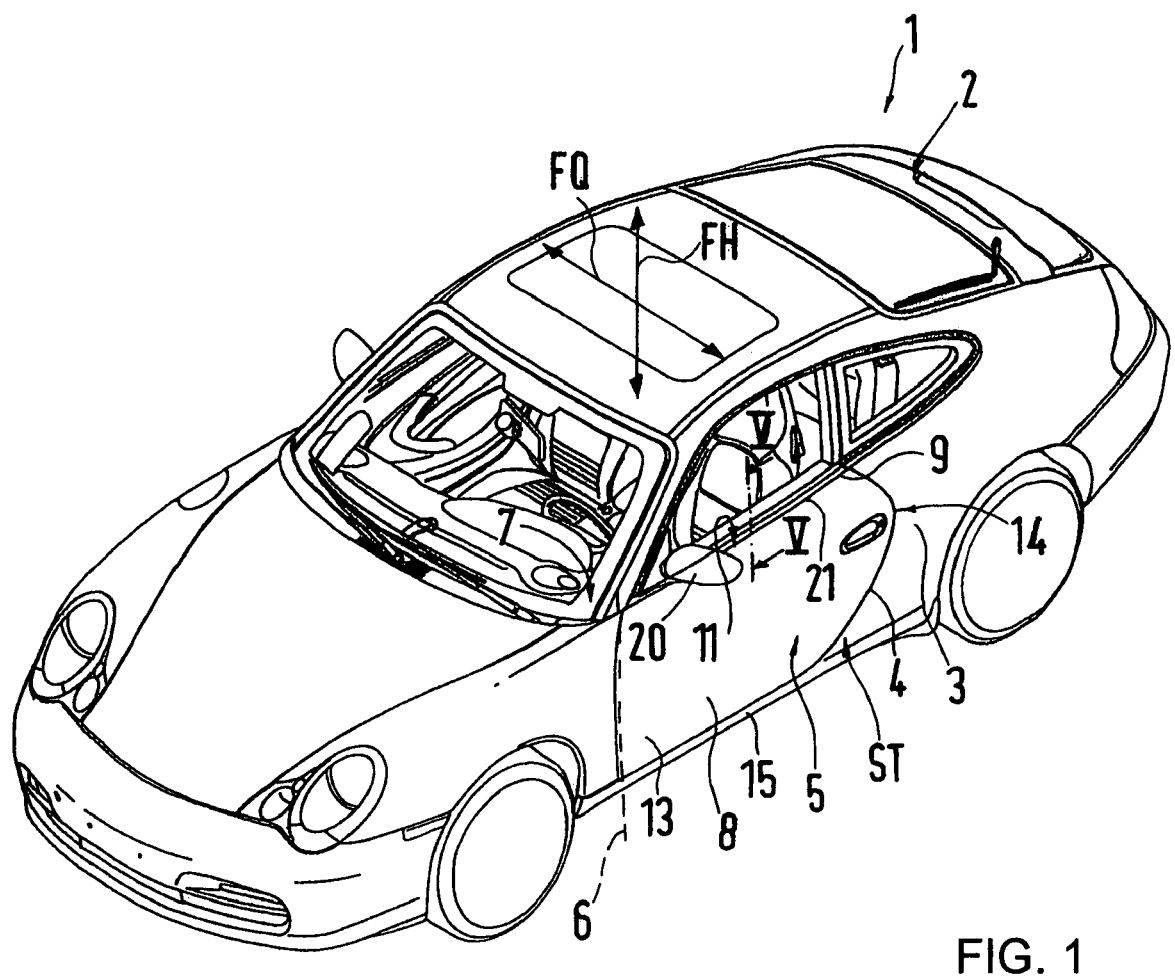
FIG. 1 is a diagrammatic, perspective view of a motor vehicle with a motor vehicle door according to the invention.

Referring now to the figures of the drawing in detail and first, particularly, to FIG. 1 thereof, there is shown a motor vehicle 1 of a configuration known per se with a construction 2, which has a body 3. In a conventional way, a motor vehicle door 5 is inserted into a body opening 4 in such a way that it can be pivoted from a shown closed position ST about a hinge axis 6 into a non-illustrated open position. In this connection, the hinge axis 6 is disposed adjacent to what is known as an A pillar 7, for example. The motor vehicle door 5 of the illustrative embodiment is accordingly a side door of the motor vehicle 1.

The motor vehicle door, referred to below simply as the door 5, has a door body 8, which lies below a waistline 9 of the body 3. The door 5 also contains a window pane 10, which can only be seen in FIG. 5 in a lowered position PA, in which it is lowered inside the door body 8. In its raised, closed position (not shown), it projects from a shaft opening 11 of the door body 8. The shaft opening 11 lies in the waistline 9 and thus follows its shape, which can be seen from FIG. 1. In the region of the door 5, the waistline 9 can have a shape which is curved, rising and/or falling in at least one transverse direction FQ of the vehicle and/or vertical direction FH of the vehicle.

Figure 2:
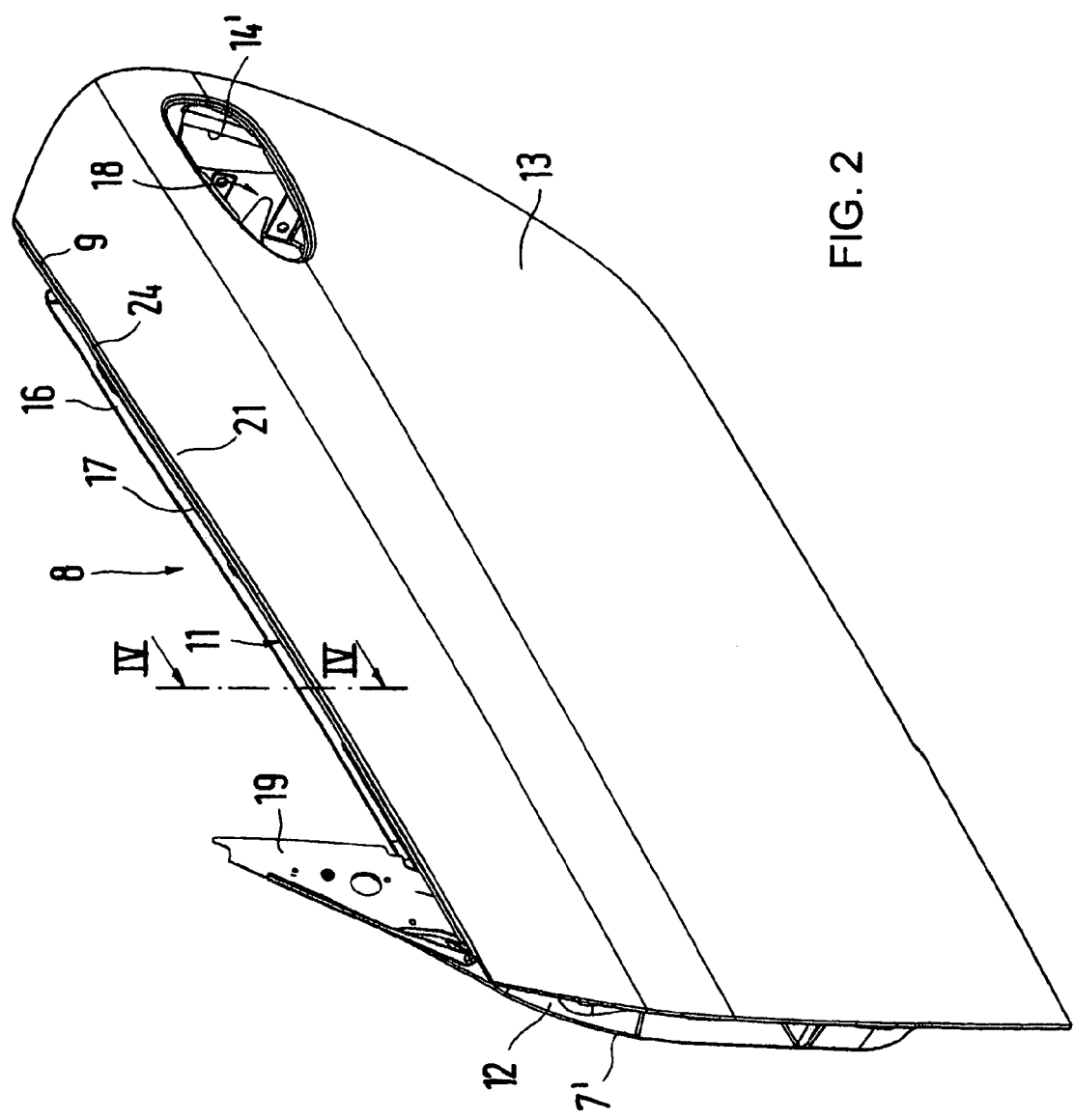
FIG. 2 is a diagrammatic, perspective view of the motor vehicle door according to FIG. 1 in an unfinished state.

The door 5 is formed of at least of a door inner part 12 (FIG. 2) and a door outer panel 13 connected thereto at the edge, and the door inner part 12 can be of an all-round construction like a frame, that is it can contain a first upright frame leg 7' adjacent to the A pillar 7, a second upright frame leg 14' adjacent to a B pillar 14 (FIG. 1), a non-illustrated lower frame leg extending adjacent to a sill 15 and lastly an upper frame leg 16 (FIG. 5) extending adjacent to the waistline 9. A shaft reinforcement 17, which is disposed below the shaft opening 11 and adjacent to the door outer panel 13, is disposed on the door inner part 12 approximately parallel to but at a distance from the frame leg 16. The door inner part 12 and the door outer panel 13 thus surround a window shaft 18, which is open toward the top through the shaft opening 11, so that the window pane 10 can be lowered into it. The shaft opening 11 can accordingly be delimited laterally by the shaft reinforcement 17 on the one hand and by the frame leg 16 on the other hand. The door inner part 12 can also be equipped with what is known as a mirror triangle 19, which serves for fastening an external rear view mirror 20 and projects above the frame leg 16 and the waistline 9.

Figure 4:
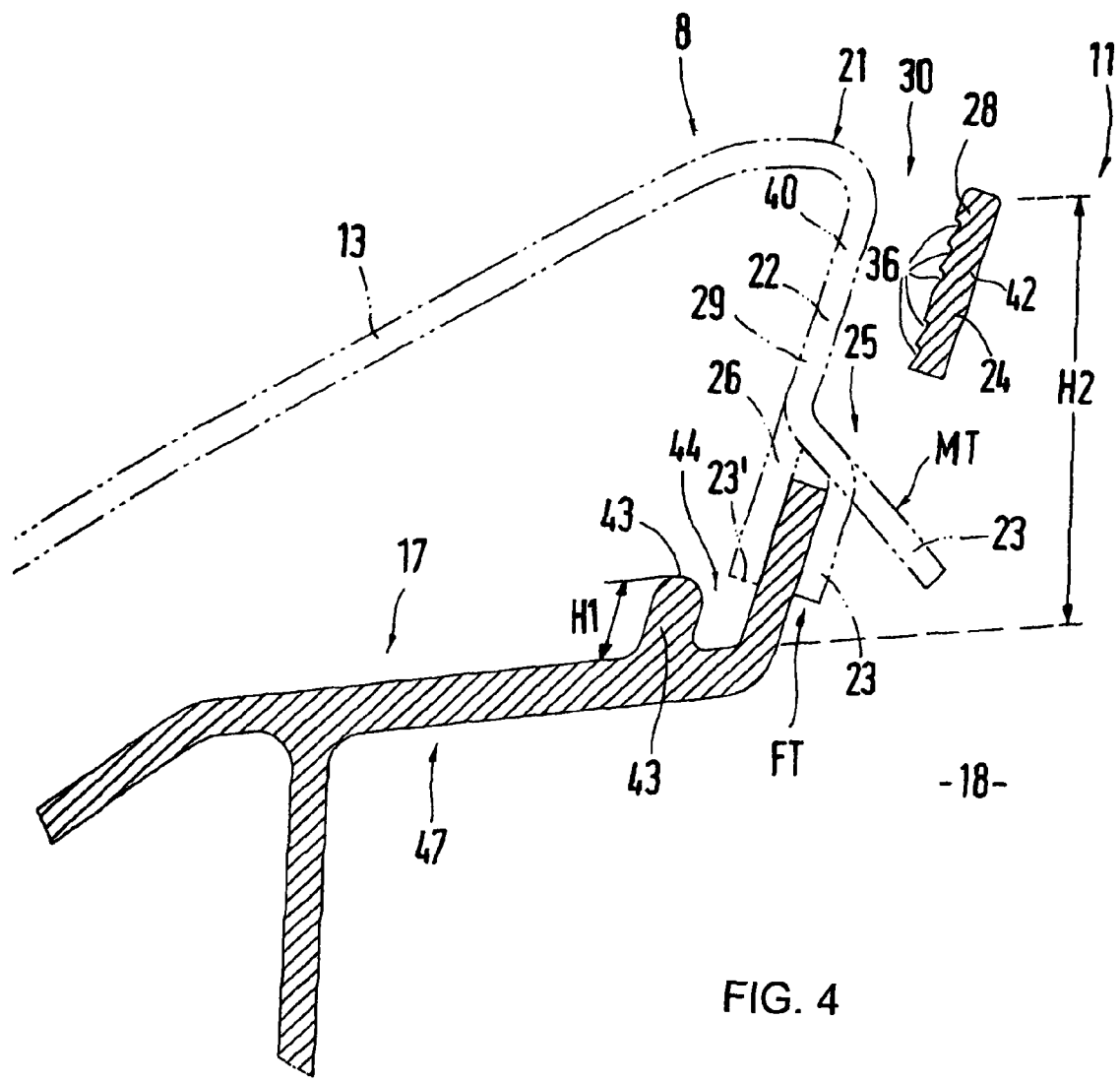
FIG. 4 is an enlarged, diagrammatic, sectional view of the motor vehicle door taken along the line IV-IV shown in FIG. 2.

As FIG. 4 shows, the door outer panel 13 contains on its upper edge 21 facing the shaft opening 11 a downwardly bent-off flange 22, which with its free end 23' is connected to the shaft reinforcement 17 as follows. One or more fastening lugs 23, which are bent off toward the shaft opening 11 from the flange 22, extend from the flange 22, which is straight but directed at an angle to an imaginary horizontal and downwardly. FIG. 4 shows a mounting position MT of the fastening lug 23 and a finished end or fixing position FT. According to the number of fastening lugs 23, one or more openings 25, into which the fastening lugs 23 can be inserted when they are in the mounting position MT, are formed in an upright first longitudinal web 24 extending upward from the shaft reinforcement 17. The door outer panel 13 can therefore be hung on the shaft reinforcement 17 with its fastening lugs 23; the fastening lugs 23 are then bent in the direction of the longitudinal web 24, preferably until they bear against it, as clarified by the fixing position FT. The longitudinal web 24 is therefore received between the fastening lugs 23 and the remaining end portion 26, with the end 23', of the flange 22. Bonding KB, which will be described in greater detail below, can additionally be provided between the flange 22 and the longitudinal web 24.

Figure 6:
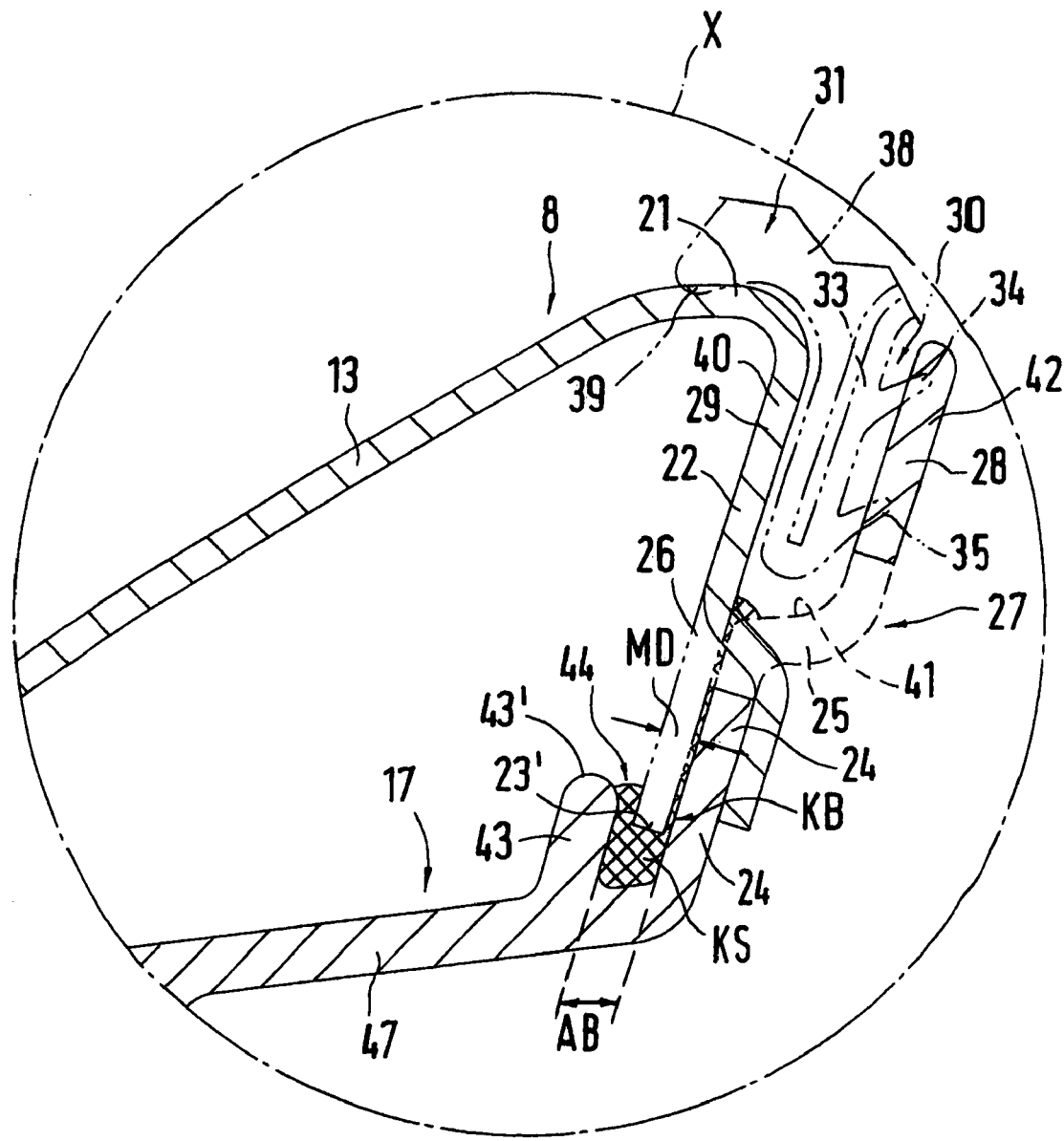
FIG. 6 is an enlarged, diagrammatic, sectional view of detail X shown in FIG. 5.

As can be seen clearly in FIG. 6, the upright first longitudinal web 24 contains in its course a step or a shoulder 27. The openings 25 for the fastening lugs 23 are formed in this inclined or curved shoulder 27 extending in the direction of the frame leg 16, so that an again upright web portion 28 of the longitudinal web 24 disposed above the shoulder 27, and a flange portion 29 of the flange 22 disposed above the fastening lugs 23 and the shoulder 27 define, that is delimit laterally and at the bottom, an upwardly open fastening groove 30. An outer window seal 31 assigned to the shaft opening 11 and the door outer panel 13 is inserted into the U-shaped or V-shaped fastening groove 30. An inner window seal 32 for the shaft opening 11 can be fastened to the frame leg 16. The outer window seal 31 contains an insertion or fastening portion 33, which is retained inside the fastening groove 30 in a clamping and/or catching or similar way. At least one sealing lip 34 or 35 lying inside the fastening groove 30, which interacts sealingly with the longitudinal web 24, can extend from the fastening portion 33. One or more sealing indentations 36, in which the free end of the sealing lip 34 or 35 comes to lie depending on how far the fastening portion 33 projects into the fastening groove 30, can accordingly be formed on the longitudinal web 24. Furthermore, at least one upwardly directed pane sealing lip 37, which interacts with the window pane 10, also extends from the fastening portion 33. Moreover, an external extension 38, which extends over the edge 21 of the door outer panel 13 and lies with a sealing bead 39 on the outer panel 13, is also formed on the fastening portion 33.

The fastening groove 30 is—as mentioned—formed by the flange portion 29, which is adjoined by the end portion 26 connected firmly to the shaft reinforcement 17 by the bonding KB. The remaining portion of the flange 22, that is the flange portion 29, is on the other hand made in the form of a free-standing wall 40 of the groove 30, which is therefore not supported laterally but is connected firmly to the shaft reinforcement 17 only with its lower end 23' or the end portion 26 and which delimits the fastening groove 30 laterally. The wall 40 stands freely, unsupported, between the edge 21 and the end portion 26. A groove bottom 41 of the fastening groove 30 is formed by the shoulder 27 and another lateral wall 42 of the longitudinal web 24, in particular by its web portion 28.

A second upright longitudinal web 43, which stands upright between the flange 22 and the door outer panel 13 but has a considerably smaller height H1 than the first longitudinal web 24 (height H2), is formed on the shaft reinforcement 17 at a lateral distance AB, that is offset in the direction of the door outer panel 13. In particular, the height H1 is dimensioned in such a way that the second longitudinal web 43 does not reach with its upper end 43' as far as the shoulder 27 or the openings 25. Moreover, the lateral distance AB between the webs 24 and 43 is clearly greater than the material thickness MD of the flange 22. A longitudinal channel 44, which serves for catching excess adhesive KS of the bonding KB, is thus formed at least in portions by at least the two webs 24 and 43. The cross section of the longitudinal channel 44 can be U-shaped or V-shaped. The width of the longitudinal channel 44 is the same as the lateral distance AB.

Figure 5:
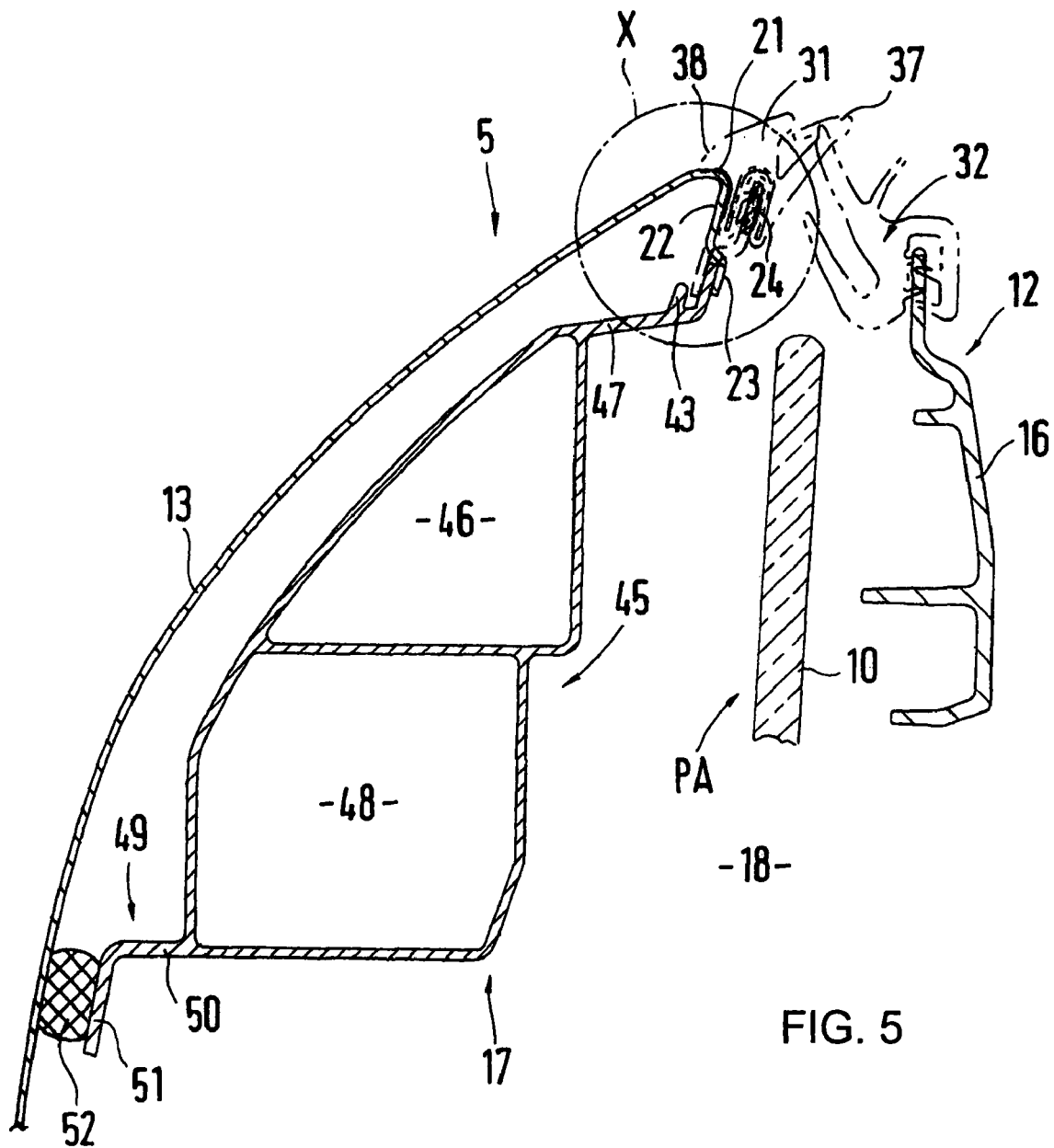
FIG. 5 is an enlarged, diagrammatic, sectional view of the motor vehicle door taken along the line V-V shown in FIG. 1.

The shaft reinforcement 17 is preferably made in one piece in the form of an extruded hollow profile (FIG. 5). This includes, for example, a one-chamber or two-chamber profile 45, if appropriate a multi-chamber profile, as a basic body, the first and second longitudinal webs 24 and 43 being connected to the basic body by an upper chamber profile 46 via a flatly rising or approximately horizontal connecting web 47. A supporting web 49, which—seen in cross section—as an angular web is equipped with a horizontal leg 50 and an upright leg 51, also extends laterally from a lower chamber profile 48. The upright leg 51 serves for supporting the door outer panel 13. For this purpose, it contains an elastic supporting element 52, in particular what is known as a swelling foam seal. As can be seen from FIG. 3, the width BR of the laterally projecting leg 50 changes over the length of the shaft reinforcement 17. The supporting web 49 can thus be adapted to the shape of the door outer panel 13.

Figure 3:
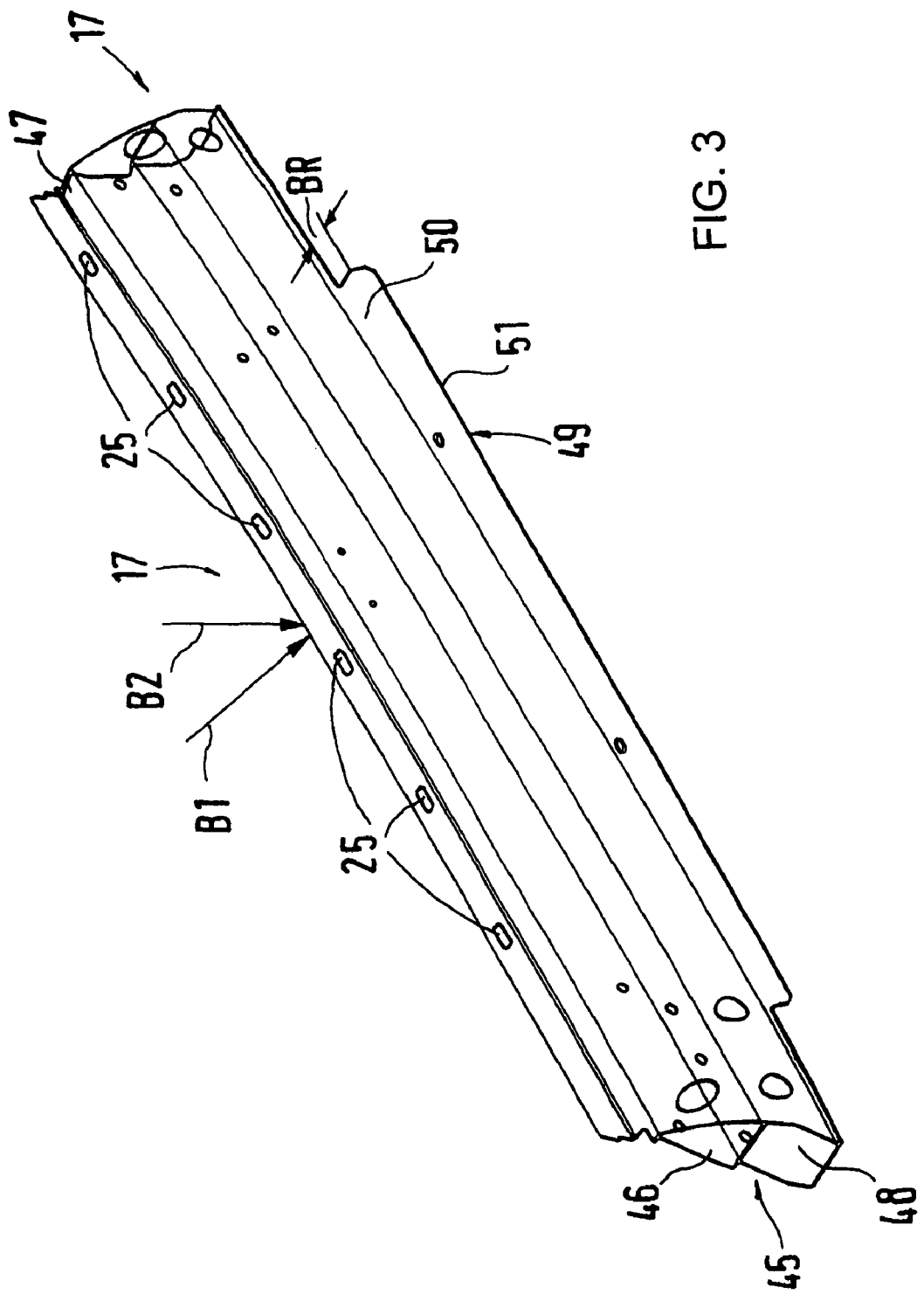
FIG. 3 is a diagrammatic, perspective view of a shaft reinforcement of the motor vehicle door according to FIG. 2.

It can also be seen from FIG. 3 that the shaft reinforcement 17 extends in a curved, rising and/or falling shape, as has already been described above in connection with the shape of the waistline 9. The shaft reinforcement 17 therefore has at least a first curving component B1 in the transverse direction FQ of the vehicle as, seen in the transverse direction FQ of the vehicle, starting from the A pillar 7 in the direction of the B pillar 14, the cross section of the door body 8 changes and/or increases or decreases in depth and/or is bellied, and/or the waistline 9 extends in a curve. An additional or alternative second curving component B2 is provided for the shaft reinforcement 17 in the vertical direction FH of the vehicle as, seen in the transverse direction FQ of the vehicle, starting from the A pillar 7 in the direction of the B pillar 14, the cross section of the door body 8 changes and/or increases or decreases in height and/or is bellied, and/or the waistline 9 extends in a curve, the waistline 9, starting from the A pillar 7 in the direction of the B pillar 14, rising or falling, for example. The arrows of the curving components B1 and B2 are indicated in the same way as an arrow for indicating a radius.

We claim:

1. A motor vehicle door, comprising:
    a door body, including:
        a door inner part;
        a door outer panel fastened to said door inner part and having an upper flange being a downwardly bent flange with a lower end portion, said door inner part and said door outer panel defining an interior having a window shaft and a shaft opening at a top of said window shaft;
        a shaft reinforcement fastened to said door inner part and extending below said shaft opening, said door outer panel being supported by said shaft reinforcement via said downwardly bent flange, said downwardly bent flange lying adjacent to said shaft opening, said shaft reinforcement having a first upright longitudinal web defining part of a fastening groove, said first upright longitudinal web having a shoulder defining a groove bottom of said fastening groove, said first upright longitudinal web having openings formed therein;
        said downwardly bent flange comprising integral one-piece fastening lugs extending through said openings formed in said first upright longitudinal web;
        a window seal for sealing said shaft opening, said window seal disposed in said fastening groove; and
        said downwardly bent flange of said door outer panel connected to said shaft reinforcement only with said lower end portion, and said downwardly bent flange delimiting said fastening groove laterally together with said first upright longitudinal web.

2. The motor vehicle door according to claim 1, further comprising:
    a second upright longitudinal web that extends from said shaft reinforcement for defining a longitudinal channel with said first upright longitudinal web, said second upright longitudinal web having a smaller height than a height of said first upright longitudinal web; and
    said downwardly bent flange of said door outer panel bonded at least to said first upright longitudinal web of said shaft reinforcement by an adhesive.

3. The motor vehicle door according to claim 2, wherein said longitudinal channel has a width being greater than a thickness of said downwardly bent flange of said door outer panel.

4. The motor vehicle door according to claim 1, wherein said openings are formed in said shoulder of said first upright longitudinal web.

5. The motor vehicle door according to claim 1, wherein said fastening lugs are inserted into said openings in a mounting position and are then bent into a fixing position.

6. The motor vehicle door according to claim 1, wherein said shaft reinforcement is an extruded hollow profile.

7. The motor vehicle door according to claim 1, wherein said door inner part has an upper frame leg and said shaft reinforcement is disposed adjacent to said upper frame leg.

8. The motor vehicle door according to claim 7, wherein said shaft reinforcement is curved.

9. The motor vehicle door according to claim 1, wherein said shaft reinforcement has a supporting web, said supporting web extends in a direction toward said door outer panel and has a cross-sectional profile complimentary to a shape of said door outer panel.

* * * * *